United States Patent [19]

Kurihara et al.

[11] Patent Number: 4,631,076
[45] Date of Patent: Dec. 23, 1986

[54] APPARATUS FOR REMOVING CARBON PARTICLES FROM EXHAUST GAS FROM INTERNAL COMBUSTION ENGINE

[75] Inventors: Mitsuo Kurihara, Machida; Fumio Sato, Kawasaki; Yoshiyuki Iwasawa, Tokyo; Nobutaka Koibuchi, Koganei; Hiroshi Harada, Matsudo, all of Japan

[73] Assignees: Tokyo Roki Co., Ltd.; Shimizu Construction Co., Ltd., both of Japan

[21] Appl. No.: 675,132

[22] Filed: Nov. 27, 1984

[30] Foreign Application Priority Data

Nov. 30, 1983 [JP] Japan .................. 58-225559

[51] Int. Cl.⁴ ............................................. B01D 46/00
[52] U.S. Cl. .............................. 55/283; 55/466; 55/DIG. 30; 60/311; 60/299; 60/303; 60/295
[58] Field of Search ............... 55/96, 283, 466, 523, 55/210, 213, DIG. 30; 60/311, 286, 299, 300, 303, 295; 423/437

[56] References Cited

U.S. PATENT DOCUMENTS

| | | | |
|---|---|---|---|
| 4,436,535 | 3/1984 | Erdmannsdorfer et al. | 55/DIG. 30 |
| 4,449,362 | 5/1984 | Frankenberg et al. | 60/311 |
| 4,462,208 | 7/1984 | Hicks et al. | 60/286 |
| 4,481,767 | 11/1984 | Stark | 60/303 |
| 4,535,588 | 8/1985 | Sato et al. | 60/303 |

FOREIGN PATENT DOCUMENTS

| | | | |
|---|---|---|---|
| 725371 | 1/1966 | Canada | 60/295 |
| 18016 | 2/1981 | Japan | 60/295 |
| 13114 | 1/1983 | Japan | 60/286 |
| 180711 | 10/1983 | Japan | 60/286 |

*Primary Examiner*—Bernard Nozick
*Attorney, Agent, or Firm*—Darby & Darby

[57] ABSTRACT

Apparatus for removing black fumes from exhaust gas from an internal combustion engine includes a filter mounted on an exhaust pipe of the engine. The filter includes a body defining a filter chamber and a filter element mounted within the filter chamber for collecting carbon particles constituting the black fume. A solution dispersing device is provided for dispersing a solution of catalyst to the exhaust gas in the filter chamber at a position upstream of the filter element to cause the oxidation of the carbon particles collected in the filter element to remove them therefrom. There is also disclosed a method of removing black fume from exhaust gas from the internal combustion engine.

1 Claim, 5 Drawing Figures

APPARATUS FOR REMOVING CARBON PARTICLES FROM EXHAUST GAS FROM INTERNAL COMBUSTION ENGINE

BACKGROUND OF THE INVENTION

1. Field of the Invention

This invention deals with the art of removing black fumes or carbon particles from exhaust gas from an internal combustion engine.

2. Prior Art

In an internal combustion engine and particularly a diesel engine, there has been a demand for an exhaust gas treating device for removing undesirable particles, including carbon particles constituting black fumes, from the exhaust gas discharged from the engine. As is well known, particles dispersed in gas can be arrested or collected by a cyclone, an electric precipitator or a filter, or by the washing with water. The use of the filter is the most effective in removing the black fumes or carbon particles from the exhaust gas. However, in the case where the filter is used in an internal combustion engine which produces a relatively large amount of black fumes, such as a diesel engine, the filter tends to become clogged in a relatively short period of time, so that the engine fails to operate properly. Therefore, in the exhaust gas treating device using the filter, it is frequently necessary to either change or clean the filter element. This requires time and labor.

And, the engine must be stopped each time the filter element is either changed or cleaned. In addition, the carbon particles collected in the filter must be disposed of. Thus, the exhaust gas treating device of this type has not been fully practical.

To overcome this difficulty, there has been proposed an exhaust gas treating device utilizing a heat-resistant filter in which the carbon particles resulting from the black fumes and collected in the heat-resistant filter is burnt by a burner to regenerate the filter. Thus, this device is advantageous in that the engine can be operated continuously and that the carbon particles collected in the filter does not need to be subjected to after-treatment. However, the amount of dissipation of heat to the atmosphere is relatively large in this exhaust gas treating device, and therefore the engine incorporating this device is not suited for an automobile or a civil engineering equipment for use in a closed space such as a tunnel unless the exhaust gas treating device is provided with means for effecting exhaust heat recovery. In addition, since the heat-resistant filter must be heated at elevated temperatures for regeneration, the filter is subjected to frequent heating and cooling particularly when the load of the black fumes or carbon particles is large. As a result, the service life of the heat-resistant filter tends to be shortened.

SUMMARY OF THE INVENTION

It is therefore an object of this invention to provide a method of and apparatus for removing black fumes or carbon particles from exhaust gas from an internal combustion engine which enables a continuous operation of the engine, can keep the temperature of a filter at a relatively low level, and obviates the need for the after-treatment of the carbon particles collected in the filter.

According to a first aspect of the present invention, there is provided a method of removing black fumes from exhaust gas from an internal combustion engine which comprises the steps of:

(a) allowing the exhaust gas to pass through a filter for collecting carbon particles, constituting the black fumes, therein; and (b) dispersing a solution of catalyst to the exhaust gas upstream of the filter to cause the oxidation of the carbon particles collected in the filter to remove them therefrom.

According to a second aspect of the present invention, there is provided an apparatus for removing black fumes from exhaust gas from an internal combustion engine which apparatus comprises:

(a) a filter mounted on an exhaust pipe of the engine, the filter comprising a body defining a filter chamber and a filter element mounted within the filter chamber for collecting carbon particles constituting the black fumes; and (b) means for dispersing a solution of catalyst to the exhaust gas in the filter chamber at a position upstream of the filter element to cause the oxidation of the carbon particles collected in the filter element to remove them therefrom.

DESCRIPTION OF THE PREFERRED EMBODIMENTS OF THE INVENTION

Figure 1:
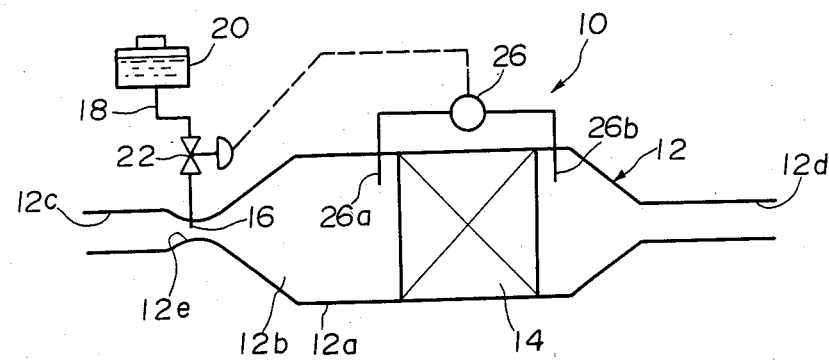
FIG. 1 is a schematic view of a black fume-removing apparatus provided in accordance with the present invention.

Like reference numerals denote corresponding parts in several views.

FIG. 1 shows a black fume-removing apparatus 10 according to a first embodiment of the invention. The apparatus 10 comprises a filter 12 including a hollow body 12a defining a filter chamber 12b therein and a heat-resistant filter element 14 received in the filter chamber 12b, the filter body 12a having a pair of inlet and outlet portions 12c and 12d of a tubular shape at opposite ends of the filter chamber 12b. The inlet portion 12c is connected to an exhaust pipe of an internal combustion engine (not shown), and the outlet portion 12d either leads to the atmosphere or is connected to catalytic converter means for treating CO, HC, NOx and the like in the exhaust gas. The inlet portion 12c is reduced in diameter adjacent to the filter chamber 12b to provide a throttle section 12e. A nozzle 16 is mounted within the throttle section 12e and is connected via a feed pipe 18 to a catalyst tank 20 for holding a catalyst solution, i.e., a solution of metal compound which causes the catalytic oxidation of the carbon particles constituting the black fumes in the exhaust gas from the internal combustion engine. A solenoid valve 22 is mounted on the feed pipe 18 for controlling the flow of the catalyst solution to the nozzle 16.

A differential pressure gauge 26 is provided for detecting a pressure loss caused by the filter element 14, that is to say, a pressure difference between two points on the opposite sides of the filter element 14. One detecting element 26a of the differential pressure gauge 26 is disposed within the filter chamber 12b between the inlet portion 12c and the filter element 14 while the other detecting element 26b is disposed within the filter chamber 12b between the filter element 14 and the outlet portion 12d. The pressure difference detected by the differential pressure gauge 26 represents the amount of the carbon particles collected in the filter element 14. An output signal of the differential pressure gauge 26 representative of this pressure difference is fed to the solenoid valve 22, and when the amount of carbon particles in the filter element 14 reaches a predetermined level, the solenoid valve 22 is opened to allow the metal compound solution to flow therethrough so that the metal compound solution is discharged from the nozzle 16. Since there is provided the throttle section 12e, the solution of metal compound or catalyst is dispersed to the exhaust gas in the filter chamber 12b.

The filter element 14 can be of any conventional type so long as it is heat-resistant and can arrest the black fumes or carbon particles in the exhaust gas and can be made of ceramics, glass fibers, carbon fibers, metal fibers, sintered alloy or the like.

The metal compound serving as the catalyst is of the type which causes the oxidation of the black fumes or carbon particles at temperatures lower than an ignition temperature (usually, 650° C.) thereof. For example, a metal compound containing at least one metal selected from the group consisting of platinum, palladium, copper and nickel can be used. It has been found through experiments that among those compounds, the compound of palladium can oxidize the black fumes or carbon particles at the lowest temperature of 350° C.

The solvent for the solution of the metal compound or catalyst is water, alcohol or other suitable organic solvents. The concentration of the catalyst is determined depending on the accuracy of control of the feed rate of the metal compound solution discharged from the nozzle 16, the solubility of the catalyst and so on.

The operation of the black fume-removing apparatus 10 will now be described.

When the exhaust gas from the internal combustion engine is introduced into the inlet portion 12c of the filter 12 and is passed through it, the black fumes in the exhaust gas is collected in the filter element 14, so that the exhaust gas almost free of the black fumes or carbon particles is discharged from the outlet portion 12d of the filter 12. Then, the carbon particles resulting from the black fumes are gradually accumulated in the filter element 14 so that the pressure loss caused by the filter element 14 increases. When this pressure loss reaches the predetermined level, the differential pressure gauge 26 outputs the detection signal to the solenoid valve 22 to open this valve for a predetermined period of time, so that the metal compound solution is fed to the nozzle 16 from the catalyst tank 20 via the feed pipe 18. Thus, the metal compound solution is discharged from the nozzle 16 at a predetermined rate and is applied to the exhaust gas in the filter chamber 12b. The catalyst in the metal compound solution discharged from the nozzle 16 is deposited on the surface of the carbon particles collected in the filter element 14 and causes the oxidation of the carbon particles with the aid of the oxygen contained in the exhaust gas at a temperature lower than the normal ignition temperature of the carbon particles. As a result, the carbon particles arrested by the filter element 14 are oxidized and removed therefrom, so that the filter element 14 is regenerated to lower the pressure loss. Therefore, the exhaust gas almost free of the carbon particles is discharged from the outlet portion 12d of the filter 12.

As described above, with the black fume-removing apparatus 10, the metal compound solution is selectively dispersed to the exhaust gas in the filter chamber 12b each time the amount of the carbon particles arrested by the filter element 14 reaches the predetermined level, so that the removal of the black fumes from the exhaust gas and the regeneration of the filter element 14 can be achieved at the same time. Therefore, when the black fume-removing apparatus 10 is used for the internal combustion engine such as a diesel engine which produces black fumes, the engine can be continuously operated, and there is no need for the after-treatment of the carbon particles arrested by the filter element 14. In addition, the regeneration of the filter element 14 can be effected at a temperature lower than the normal ignition temperature of the carbon particles constituting the black fumes. Thus, since the filter element 14 is not subjected to extremely high temperatures, the filter element 14 can be used for a much longer period of time in comparison with the conventional method in which the regeneration of the filter element is effected by a burner.

EXAMPLE 1

A black fume-removing test was carried out using the black fume-removing apparatus 10 attached to an exhaust pipe of a four-cylinder diesel engine having a displacement of 3,600 cc. A pair of temperature detecting elements were disposed in the filter chamber 12b on inlet and outlet sides of the filter element 14, respectively. The filter element 14 was made of cordierite. The engine was started and caused to idle to be warmed up and then was operated at a load of 2,000 rpm which was three fourths of the full load. Then, when the temperature T1 on the inlet side of the filter element was increased to 350° C., 50 cc of an aqueous solution of 1% $Pd(NH_4)_3(OH)_2$ serving as the catalyst solution was discharged from the nozzle 16 to the exhaust gas in the filter chamber 12b. Then, the temperature T1 on the inlet side of the filter element 14 and the temperature T2 on the outlet side of the filter element 14 were measured. Immediately after the catalyst solution was discharged from the nozzle 16, the carbon particles collected in the filter element 14 began to be burnt, and approximately one minute after the discharge of the catalyst solution, the temperature T2 became higher than the temperature T1.

EXAMPLE 2

According to the same procedure of EXAMPLE 1 except that the catalyst solution was an aqueous solution of 10% $Cu(NH_3)_4(OH_2)$, a black fume-removing test was carried out. Approximately 3 minutes after the discharge of the catalyst solution from the nozzle 16 when the temperature T1 was above 500° C., the carbon particles collected in the filter element 14 began to be burnt.

Figure 2:
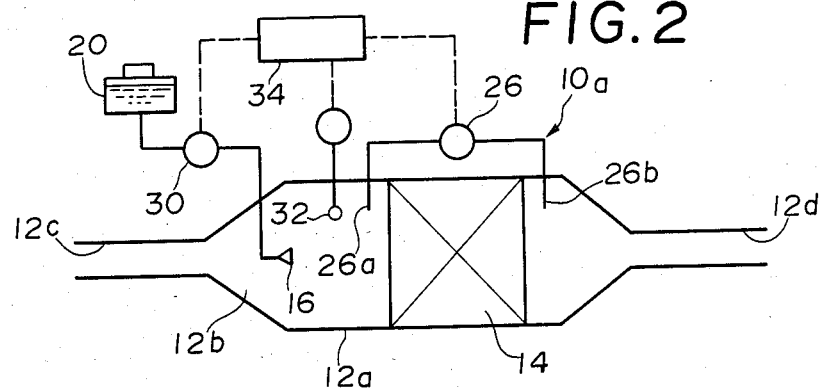
FIGS. 2 to 5 are views similar to FIG. 1 but showing modified black fume-removing apparatuses.

FIG. 2 shows a black fume-removing apparatus 10a according to a second embodiment of the invention which differs from the black fume-removing apparatus 10 of FIG. 1 in that a pump 30 replaces the solenoid valve 22 and that a temperature detecting element 32 is mounted in a filter chamber 12b between an inlet portion 12c and a filter element 14. The pump 30 is operated in accordance with detection signals of the temperature detecting element 32 and differential pressure gauge 26 through a control device 34 such as a logic circuit. In addition, the inlet portion 12c of a filter body 12a is not provided with a throttle section, and a nozzle 16 is disposed within the filter chamber 12b and is directed toward the filter element 14.

In this embodiment, before the temperature of the exhaust gas in the filter chamber 12b reaches a predetermined temperature sufficiently high to cause the oxidation of the carbon particles arrested by the filter element 14, a solution of metal compound or catalyst in a catalyst tank 20 is not sprayed to the exhaust gas in the filter chamber 12b. For example, during the warming-up of the internal combustion engine immediately after its start, the temperature of the exhaust gas in the filter chamber 12b is not high enough to cause the oxidation of the carbon particles constituting the black fumes. During this period, the control device 34 is responsive to the detection signal from the temperature detecting element 32 to hold the pump 30 in its inoperative condition. After the temperature of the exhaust gas in the filter chamber 12b reaches the predetermined temperature sufficiently high to cause the oxidation of the carbon particles and when the amount of the carbon particles arrested by the filter element 14 reaches the predetermined level, the control device 34 is responsive to the detection signals from the temperature detecting element 32 and differential pressure gauge 26 to operate the pump 30 to feed a predetermined amount of the catalyst solution to the nozzle 16 to spray the solution toward the filter element 14, so that the carbon particles arrested by the filter element 14 are oxidized as described above for the first embodiment of FIG. 1. With this black fume-removing apparatus 10a, the solution of metal compound or catalyst can be used efficiently.

Figure 3:
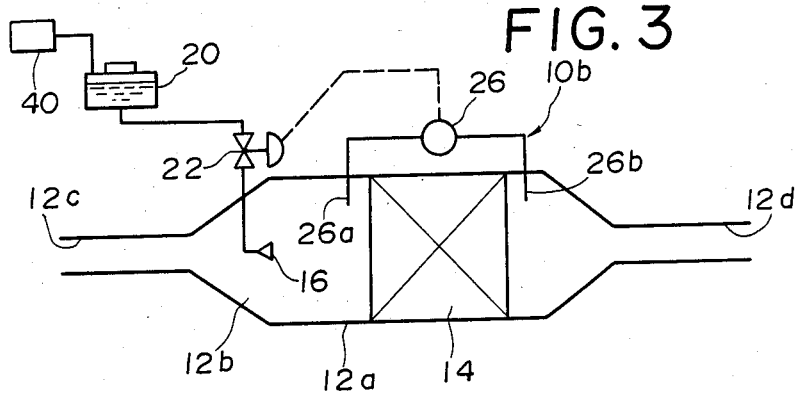

FIG. 3 shows a black fume-removing apparatus 10b according to a third embodiment of the invention which differs from the black fume-removing apparatus 10 of FIG. 1 in that a compressor means 40 which is replaces the throttle section 12e is connected to a catalyst tank 20 for feeding a solution of metal compound or catalyst under pressure to a solenoid valve 22 and in that a nozzle 16 is disposed in a filter chamber 12b and is directed toward a filter element 14. With this construction, when the solenoid valve 22 is opened, the catalyst solution is sprayed from the nozzle 16 toward the filter element 14.

Figure 4:
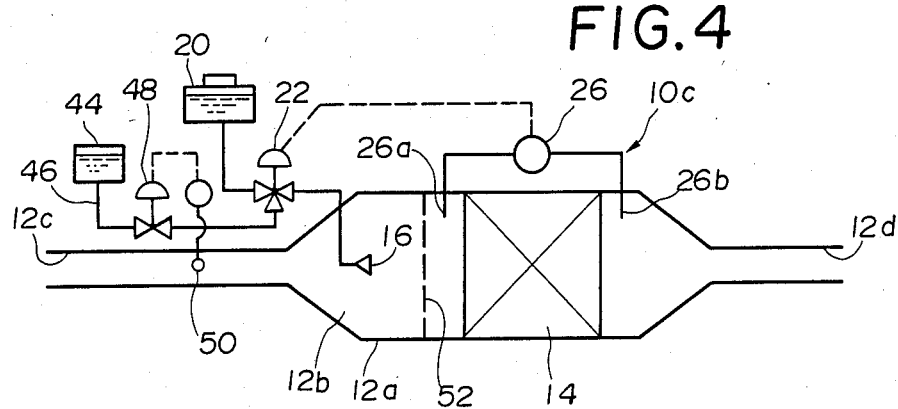

FIG. 4 shows a black fume-removing apparatus 10c according to a fourth embodiment of the invention which differs from the black fume-removing apparatus 10 of FIG. 1 in that auxiliary fuel is applied to a filter chamber 12b to increase the temperature of the exhaust gas to enable the oxidation of the carbon particles arrested by a filter element 14. More specifically, a fuel tank 44 containing the auxiliary fuel such as gas oil is connected to the solenoid valve 22 via a conduit 46, and another solenoid valve 48 is mounted on the conduit 46 for controlling the flow of the auxiliary fuel. A temperature detecting element 50 is disposed in the filter chamber 12b between an inlet portion 12c and the filter element 14 for detecting the temperature of the exhaust gas to output a detection signal. When the temperature of the exhaust gas in the filter chamber 12b does not reach a predetermined temperature sufficiently high to cause the oxidation of the carbon particles arrested by the filter element 14, for example, during the warming-up of the internal combustion engine, the solenoid valve 48 is responsive to the detection signal from the temperature detecting element 50 to be opened to feed the auxiliary fuel to the solenoid valve 22. In this condition, when the amount of the carbon particles arrested by the filter element 14 reaches the predetermined level as described above, the solenoid valve 22 is opened, so that a mixture of the catalyst solution and the auxiliary fuel is sprayed from the nozzle 16 toward a wire netting 52 mounted within the filter chamber 12b between the nozzle 16 and the filter element 14. The wire netting 52 serving as ignition means is electrically heated to such an extent that the auxiliary fuel is ignited by the wire netting 52 to heat the exhaust gas to a temperature sufficiently high to cause the oxidation of the carbon particles arrested by the filter element 14.

When the temperature of the exhaust gas in the filter chamber 12b is sufficiently high to cause the oxidation of the carbon particles, the solenoid valve 48 is responsive to the detecting signal from the temperature detecting element 50 to be held in its closed condition, thereby preventing the auxiliary fuel from flowing to the solenoid valve 22. Therefore, in this case, when the amount of the carbon particles arrested by the filter element 14 reaches the predetermined level, the solenoid valve 22 is opened to cause only the the catalyst solution to be sprayed from the nozzle 16. Even in this case, it is necessary that the oxidation of the carbon particles in the presence of the catalyst should be effected at a temperature lower than the normal ignition temperature of the carbon particles. To ensure this, another temperature detecting means for detecting this normal ignition temperature and means for controlling the feed rate of the catalyst solution and the feed rate of the auxiliary fuel may be provided.

Figure 5:
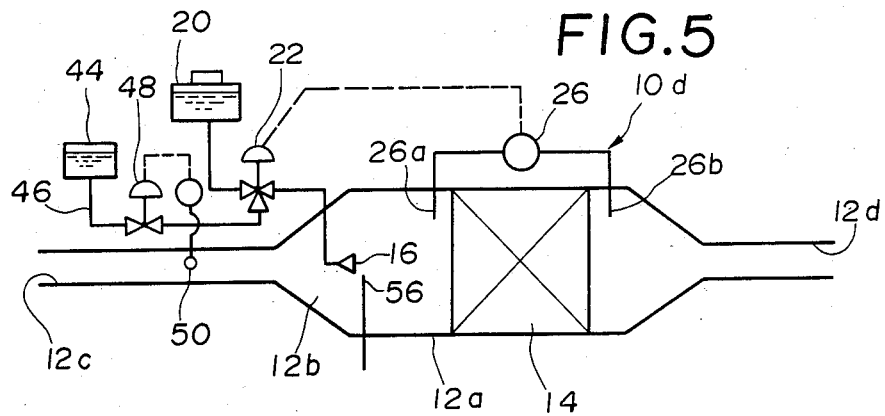

FIG. 5 shows a black fume-removing apparatus 10d according to a fifth embodiment of the invention which differs from the black fume-removing apparatus 10c of FIG. 4 in that a spark-ignition means 56 replaces the wire netting 52. The spark-ignition means 56 comprises a pair of electrodes between which a spark is caused to occur to ignite the auxiliary fuel introduced into filter chamber 12b.

While the black fume-removing apparatuses according to the invention have been specifically shown and described herein, the invention itself is not to be restricted by the exact showing of the drawings or description thereof. For example, although the catalyst solution is controlled to be intermittently fed to the filter chamber 12b, the catalyst solution may be continuously fed at a controlled rate.

What is claimed is:

1. Apparatus for removing particulate emissions from exhaust gas from an internal combustion engine which apparatus comprises:
   (a) filter mounted on an exhaust pipe of the engine, said filter comprising a body defining a filter chamber and a filter element mounted within said filter chamber for collecting carbon particles constituting the particulate emissions;
   (b) means for dispersing a solution of catalyst to the exhaust gas in said filter chamber at a position upstream of said filter element to cause the oxidation of the carbon particles collected in said filter element to remove them therefrom, said dispersing means including a source of supply of said catalyst solution, means connected to said supply source for controlling the flow of said catalyst solution, means for detecting the amount of the carbon particles collected in said filter element to feed a first detection signal when said amount of the carbon particles reaches a predetermined level, means for detecting the temperature of the exhaust gas in said filter chamber to feed a second detection signal until said temperature of the exhaust gas reaches a predetermined level;

(c) means for supplying an auxiliary fuel to the exhaust gas in said filter chamber at a position upstream of said filter element, said auxiliary fuel supply means being operable in response to said second detection signal for supplying said auxiliary fuel to said flow control means, and said flow control means being operable in response to said first detection signal for feeding a mixture of the catalyst solution and the auxiliary fuel to said filter chamber; and (d) ignition means mounted within said filter chamber adjacent to and upstream of said filter element for igniting said auxiliary fuel fed to said filter chamber to increase the temperature of the exhaust gas.

* * * * *